(12) United States Patent
Lorenz et al.

(10) Patent No.: US 10,673,764 B2
(45) Date of Patent: Jun. 2, 2020

(54) DISTRIBUTED AFFINITY TRACKING FOR NETWORK CONNECTIONS

(71) Applicant: INTERNATIONAL BUSINESS MACHINES CORPORATION, Armonk, NY (US)

(72) Inventors: Dean H. Lorenz, Haifa (IL); Valleriya Perelman, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 15/985,889

(22) Filed: May 22, 2018

(65) Prior Publication Data
US 2019/0363990 A1  Nov. 28, 2019

(51) Int. Cl.
| H04L 12/24 | (2006.01) |
| H04L 12/813 | (2013.01) |
| H04L 12/803 | (2013.01) |
| H04L 12/851 | (2013.01) |
| H04L 12/721 | (2013.01) |
| H04L 12/743 | (2013.01) |
| H04L 12/707 | (2013.01) |

(52) U.S. Cl.
CPC .............. *H04L 47/20* (2013.01); *H04L 45/24* (2013.01); *H04L 45/38* (2013.01); *H04L 45/7453* (2013.01); *H04L 47/125* (2013.01); *H04L 47/2483* (2013.01)

(58) Field of Classification Search
CPC ....................................................... H04L 12/24
See application file for complete search history.

(56) References Cited

U.S. PATENT DOCUMENTS

| 7,843,843 B1 | 11/2010 | Papp, III et al. |
| 8,046,467 B2 | 10/2011 | Petter et al. |
| 8,176,495 B2 | 5/2012 | Sen et al. |
| 8,514,865 B2 | 8/2013 | Sharma et al. |
| 9,237,132 B2 | 1/2016 | Mihelich et al. |

(Continued)

OTHER PUBLICATIONS

IBM: List of IBM Patents or Patent Applications Treated As Related (Appendix P), May 22, 2018, pp. 1-2.

(Continued)

*Primary Examiner* — Brandon M Renner
(74) *Attorney, Agent, or Firm* — Anthony M. Pallone

(57) ABSTRACT

An embodiment of the invention may include a method, computer program product, and system for data transfer management. The embodiment may include receiving a data packet from a client computing device. The received data packet is part of a data flow. The embodiment may include determining that the received data packet is not part of a data flow tracking list. The embodiment may include computing a current mapping value for the received data packet. The embodiment may include determining that a global system state of expecting change exists. The embodiment may include computing an expected mapping value for the received data packet. The embodiment may include determining that the expected mapping value is not equal to the current mapping value. The embodiment may include adding the data flow to the data flow tracking list. The embodiment may include forwarding the received data packet according to the current mapping value.

20 Claims, 10 Drawing Sheets

(56) References Cited

U.S. PATENT DOCUMENTS

| | | | |
|---|---|---|---|
| 9,614,773 | B1 | 4/2017 | Tagore |
| 9,923,832 | B2 | 3/2018 | Wetterwald et al. |
| 10,110,684 | B1 | 10/2018 | Haltore et al. |
| 2002/0141401 | A1* | 10/2002 | Albert ............... H04L 12/4633 370/389 |
| 2002/0161839 | A1* | 10/2002 | Colasurdo ............... H04L 29/06 709/204 |
| 2004/0073694 | A1 | 4/2004 | Frank et al. |
| 2010/0036903 | A1 | 2/2010 | Ahmad et al. |
| 2010/0149966 | A1 | 6/2010 | Achlioptas et al. |
| 2011/0252127 | A1 | 10/2011 | Iyengar et al. |
| 2013/0054761 | A1 | 2/2013 | Kempf et al. |
| 2013/0054781 | A1 | 2/2013 | Kempf et al. |
| 2015/0026794 | A1 | 1/2015 | Zuk et al. |
| 2015/0063115 | A1 | 3/2015 | Patel et al. |
| 2015/0180769 | A1 | 6/2015 | Wang et al. |
| 2015/0312155 | A1 | 10/2015 | Anand et al. |
| 2015/0350087 | A1 | 12/2015 | Hong et al. |
| 2017/0208011 | A1 | 7/2017 | Bosch et al. |
| 2017/0324664 | A1 | 11/2017 | Xu et al. |
| 2018/0046807 | A1 | 2/2018 | Patil et al. |
| 2018/0260324 | A1* | 9/2018 | Marathe ............... G06F 12/0804 |
| 2018/0332124 | A1 | 11/2018 | Haltore et al. |
| 2019/0011283 | A1* | 1/2019 | Soutar ............... H04L 67/22 |
| 2019/0140924 | A1 | 5/2019 | Koponen et al. |

OTHER PUBLICATIONS

Arodland, "Improving load balancing with a new consistent-hashing algorithm," https://medium.com/vimeo-engineering-blog/improving-load-balancing-with-a-new-consistent-hashing-algorithm-9flbd75709ed, Medium.com, Dec. 19, 2016, pp. 1-9.

Microsoft, "Network Load Balancing Technical Overview," https://docs.microsoft.com/en-us/previous-versions/windows/it-pro/windows-server-2000/bb742455(v=technet.10), Microsoft.com, Dec. 9, 2009, pp. 1-45.

Eisenbud et al., "Maglev: A Fast and Reliable Software Network Load Balancer," Proceedings of the 13th USENIX Symposium on Networked Systems Design and Implementation (NSDI '16), Mar. 16-18, 2016, Santa Clara, CA, USA, pp. 523-535.

Lorenz, et al,. "Distributed Affinity Tracking for Network Connections", U.S. Appl. No. 15/904,588, filed Feb. 26, 2018. pp. 1-40.

Lorenz, et al,. "Distributed Affinity Tracking for Network Connections", U.S. Appl. No. 15/631,073, filed Jun. 23, 2017, pp. 1-42.

Mell et al., "The NIST Definition of Cloud Computing," NIST, Sep. 2011, pp. 1-7, Special Publication 800-145, U.S. Department of Commerce.

* cited by examiner

DISTRIBUTED AFFINITY TRACKING FOR NETWORK CONNECTIONS

BACKGROUND

The present invention relates to sending data across a network, and more specifically, to maintaining affinity in relation to distribution of data across the network.

Maintaining data affinity ensures that related data packets (aka "data flows") will be forwarded to the same destination. Ensuring data affinity across a network is a desired network attribute of a network forwarding function that supports multiple destination and/or multiple paths (e.g. a load-balancing system). For example, data packets from the same transmission control protocol (TCP) connection require affinity to avoid a loss of connection, data packets from the same source IP address desire affinity to allow abbreviated transport layer security (TLS) handshakes, and data packets from the same client computing device require affinity to support application specific optimizations and session states.

BRIEF SUMMARY

An embodiment of the invention may include a method, computer program product, and system for data transfer management. The embodiment may include receiving, by a load balancer, a data packet from a client computing device. The received data packet is part of a data flow. The embodiment may include determining, by the load balancer, that the received data packet is not part of a data flow tracking list. The data flow tracking list includes one or more existing data flows tracked by the load balancer. The embodiment may include computing, by the load balancer, a current mapping value for the received data packet. The embodiment may include determining, by the load balancer, that a global system state of expecting change exists. The embodiment may include computing, by the load balancer, an expected mapping value for the received data packet. The embodiment may include determining, by the load balancer, that the expected mapping value is not equal to the current mapping value. The embodiment may include adding, by the load balancer, the data flow to the data flow tracking list. Adding the data flow to the data flow tracking list includes adding one or more tracking characteristics of the received data packet to a list of tracking characteristics for the one or more existing data flows tracked by the load balancer. The embodiment may include forwarding, by the load balancer, the received data packet according to the current mapping value for the received data packet.

DETAILED DESCRIPTION

Figure 1A:
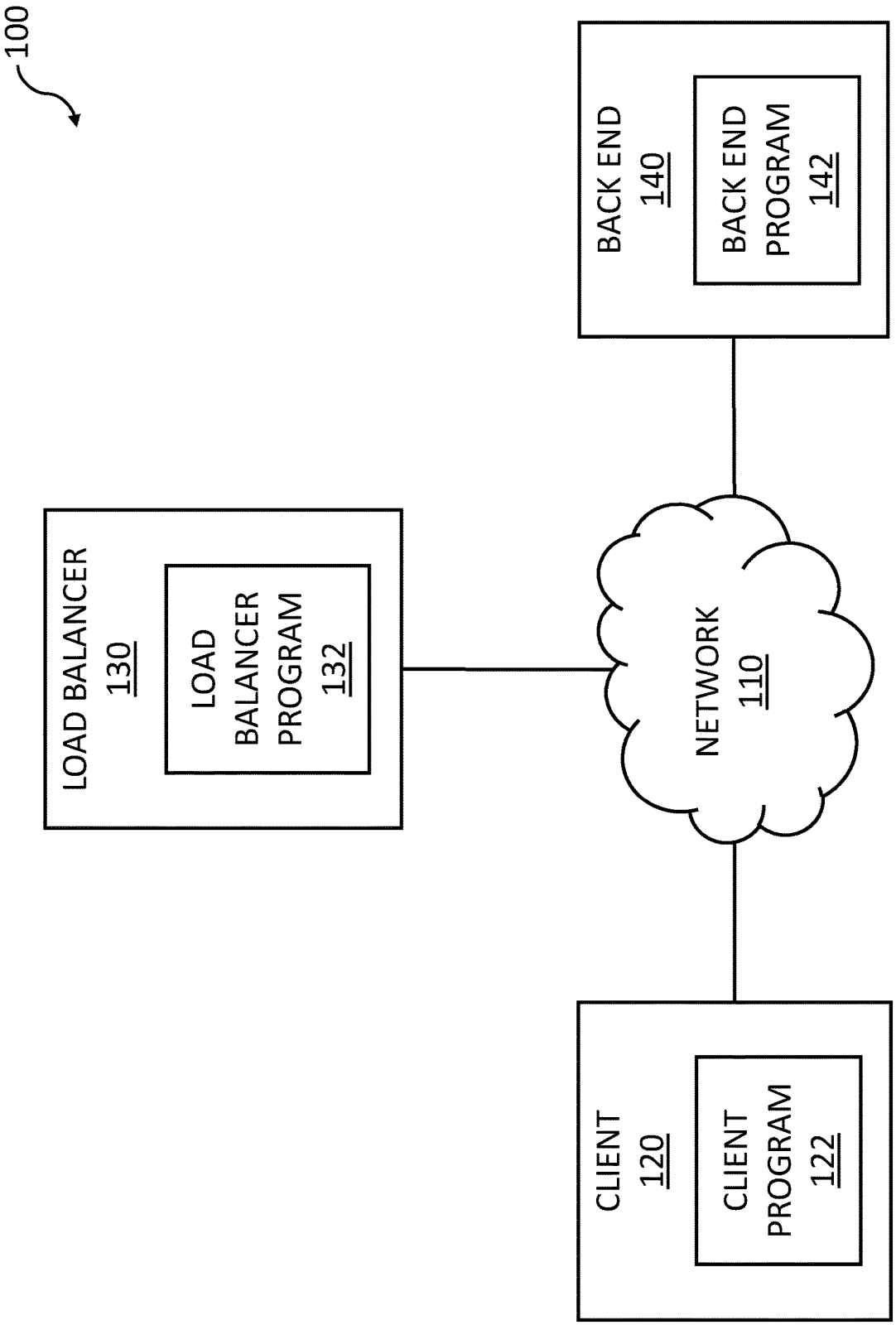
FIG. 1A is a functional block diagram illustrating a distributed affinity tracking system, in accordance with an embodiment of the present invention.

In distributed utility computing environments, such as clouds and other networks, it is advantageous to ensure that resources providing computing services can elastically grow and shrink according to the service load imposed by client computing devices. When client service load increases, a network is expected to adapt by allocating more resources and increasing the service capacity so that client computing devices do not experience network disturbances resulting from increased service load. When client service load decreases, the network is expected to adapt by timely releasing unneeded resources to reduce the overall operational costs and improve overall resource utilization by assigning resources elsewhere. Resource elasticity is typically implemented through a scalable pool of back-end network service nodes, for example, a back-end network server. Back-end network service nodes are added and removed to align allocated resource capacity with total client imposed service load. An additional entity, a load balancer, can be added to the distributed computing environment to receive client requests and multiplex them among the back-end network service nodes in the pool.

Typically, the load balancer is configured to provide balanced distribution and forwarding of client requests for computing services over the network to back-end network service nodes. The load balancing algorithm, which determines the routing path for forwarding network client data packets, must consider several dynamic parameters, for example, back-end network service node pool size, utilization of resources, capacity of resources, and network client request characteristics. To ensure that the load balancer is not a single point of failure or a service bottleneck, the load balancer can also be implemented as an elastic service using a pool of load balancer nodes. In this case, data packets from the same data flow (i.e. same network client computing device) may be load-balanced by different load balancer nodes. The pool of load balancer nodes can also be dynamic, in that load balancers may be added to or removed from the pool in response to load balancer failures or changes in network load.

When implementing network load balancing, it is important, and often required, that related data packets ("data flows") from the same network client computing device be routed to the same back-end network service node destination. The practice of routing data flows from a client computing device to the same back-end network service node destination is known as client connection affinity. Maintaining affinity in large network and large cloud environments presents significant scalability issues and may lead to network bottleneck issues. These issues are further complicated in dynamic networks where network components may be added, modified, removed, or become unavailable.

The load balancer forwarding decision must change, yet still maintain affinity. For example, when adding a new back-end network service node (e.g. back-end network server), new data flows may be forwarded to the new back-end network service node. Existing data flows, however, must be routed to their existing back-end network service node destination. As another example, in a network environment where a pool of load balancer nodes is utilized, there may be multiple load balancer nodes that are dynamically added or removed and the resulting per flow forwarding decision must be consistent across all the load balancer nodes.

Connection tracking may be used to maintain affinity in large scale dynamic networks by tracking active connections. Connection tracking remembers the forwarding decision for each data flow throughout its lifetime. For example, one can track each transmission control protocol (TCP) 5-tuple (i.e. source IP address/port number, destination IP address/port number, and the network protocol in use) throughout the TCP flow lifetime and log the forwarding decision entry as a forwarding rule in a connection tracking table. Each new incoming TCP packet is first checked to see if it is part of an existing data flow by referencing its 5-tuple and if found, the existing forwarding rule is applied. However, this solution is not scalable, as both system memory requirements and forwarding decision entry lookup time increase with the number of data flows. Another drawback of connection tracking is that it requires synchronization of the connection tracking state between all load balancer nodes.

Hashing can also be used to maintain data affinity. A hash function is used to compute an index into an array of buckets or slots from which the desired value can be found. Using this approach, a hash function is used which deterministically maps data flows, based on their attributes (e.g. source IP addresses), to available back-end network servers. This deterministic mapping is performed in two steps. First, a hash value, based on using a data packet's attributes as input, is calculated for each incoming data packet. In the second step, calculated hash values may be mapped to back-end network servers through a lookup table, using the hash value as the lookup key. Affinity can be maintained as hash calculations for similar data packets produce the same hash value. For example, one can determine the back-end network service node destination for each TCP 5-tuple by its hash. An advantage of hashing is that load balancer nodes make the same forwarding decision if the same hash function and attributes are used. However, the main drawback of hashing is its handling of dynamic network conditions, since any change in the back-end network service node pool will alter hash values and the resulting lookup table and cause most data flows to be re-routed ("reshuffling"). Furthermore, if different load balancer nodes have different views of the back-end network service node pool, then they might have completely different forwarding decision behavior. Embodiments of the present invention may use hashing to deterministically map data packets of incoming data flows to their forwarding destination by mapping each data packet to a slot in a lookup table.

Consistent-hashing is an enhancement to hashing that uses specially designed hash methods that reduce reshuffling during changes to the back-end network service node pool. However, even with consistent-hashing, there is still some reshuffling and to avoid data flow breaks there is still a need for connection tracking, otherwise data flow affinity is not maintained for some portion of the data flows. In large dynamic network environments, the amount of reshuffling becomes significant.

Embodiments of the present invention disclose a distributed affinity tracking ("DAT") system 100, described below, which provides a method for maintaining load balancing data affinity in large scale dynamic network environments by implementation of distributed affinity tracking through feedback from the back-end network service nodes. Back-end network service nodes already track affinity for the data flows they serve. Moreover, there is no need to maintain affinity if it is inconsequential to the back-end network service nodes. DAT system 100 combines back-end network service node affinity tracking with existing affinity tracking approaches (i.e. connection tracking and consistent-hashing) to increase their scalability and efficiency in response to changes in the back-end service node pool.

Usually, data affinity can be simply and efficiently maintained using one of the common approaches above. In particular, consistent-hashing correctly maps most data flows, even during a change in the back-end, and requires connection tracking only for the small number of mishandled data flows which result from changes in the network state, such as changes to the back-end network service node pool (e.g. addition/removal of a back-end network service node). DAT system 100 enhances consistent-hashing by offloading the connection tracking, sometimes required in response to mishandled data flows, from the load balancer nodes to the back-end network service nodes. DAT system 100 enables back-end network service nodes to notify load balancer nodes of erroneously remapped existing data flows. Furthermore, DAT system 100 enables the back-end network service nodes to provide the load balancer nodes with information such as, data flow tracking details, forwarding decision hints, and notifications concerning changes in the back-end network service node pool. Optionally, DAT system 100 may also allow back-end network service nodes to offload some of the load balancing work, traditionally performed by load balancer nodes, by participating in data packet forwarding.

Embodiments of the present invention will now be described in detail with reference to the accompanying Figures.

FIG. 1A is a functional block diagram illustrating distributed affinity tracking system 100, in accordance with an embodiment of the present invention. Distributed affinity tracking system 100 may be a distributed communication environment, including client 120, load balancer 130, and back end 140, all interconnected via network 110.

In various embodiments, network 110 may represent, for example, an intranet, a local area network (LAN), a wide area network (WAN) such as the Internet, or a combination of the two. Network 110 may include, for example, wired, wireless or fiber optic connections. In general, network 110 may be any combination of connections and protocols that will support communications between client 120, load balancer 130, and back end 140, in accordance with an embodiment of the invention.

Client 120 may represent a network computing device capable of hosting client applications. Client 120 may include client program 122. In an example embodiment, client 120 may be a desktop computer, a notebook, a laptop computer, a tablet computer, a handheld device, a smartphone, a thin client, or any other electronic device or computing system capable of sending and receiving data to and from other computing devices such as load balancer 130 or back end 140, via network 110. As depicted in the example illustration in FIG. 1B, client 120 may be implemented using multiple devices, referred to as client 120A, client 120B, and client 120C. In various embodiments, client 120 may be depicted with reference to FIG. 4.

In various embodiments, client program 122 may be a program, or subroutine contained in a program, that may allow a user of client 120 to request and utilize services from a back-end network server, via network 110 and load balancer program 132. Client program 122 may include components used to transmit data to an application residing on load balancer 130. In an example embodiment, client program 122 may send a TCP 5-tupple data packet, as part of a data flow, to load balancer program 132.

Load balancer 130 may represent a network component capable of hosting a load balancing program. Load balancer 130 may include load balancer program 132. In an example embodiment, load balancer 130 may be a desktop computer, a networked computer appliance, a server blade, a specialized computer server, or any other electronic device or computing system capable of hosting a load balancing program. As depicted in the example illustration in FIG. 1B, load balancer 130 may be implemented using multiple devices, referred to as load balancer 130A and load balancer 130B. Load balancer 130 may be depicted with reference to FIG. 4.

In various embodiments, load balancer program 132 may be a program, or subroutine contained in a program, that may implement the functionality to provide balanced distribution and forwarding of network client requests over the network to back-end network service nodes. In an example embodiment, load balancer program 132 may receive a data packet from client program 122, via network 110, and forward the received data packet to back end program 142. The received data packet may be one of several related data packets which form a data flow from client 120.

Back end 140 may represent a computing platform capable of hosting one or more resources for use by another computing device, such as, client 120. Back end 140 may include back end program 142. In an example embodiment, back end 140 may be a desktop computer, a networked computer appliance, a server blade, a specialized computer server, or any other electronic device or computing system capable of sending and receiving data to and from other computing devices such as client 120 or load balancer 130, via network 110. Although not shown, optionally, back end 140 may include a cluster of servers executing the same software to collectively process and monitor the requests of other computing devices such as client 120. In another embodiment, back end 140 may host load-balancing functionality and perform data packet forwarding. As depicted in the example illustration in FIG. 1B, back end 140 may be implemented using multiple devices, referred to as back end 140A, back end 140B, back end 140C, and back end 140D. Back end 140 may be depicted with reference to FIG. 4.

In various embodiments, back end program 142 may be a program, or subroutine contained in a program, that may facilitate data requests received from client program 122, via load balancer program 132. Furthermore, back end program 142 may already perform connection tracking for the data flows it serves. Being the affinity consumers, back end program 142 may track exactly the data affinity that needs maintaining for each incoming data packet (e.g. the source IP address, source port number, destination IP address, destination port number, and the protocol in use). In an example embodiment, back end program 142 may receive a data packet from load balancer program 132. The received data packet may originate from client program 122 and represent part of a data flow from client 120. Back end program 142 may serve the received data packet or notify load balancer program 132 of an incorrect forwarding of the received data packet. The operations and functions of load balancer program 132 and back end program 142 are described in further detail below with regard to FIGS. 2A, 2B, 3A, and 3B.

Figure 1B:
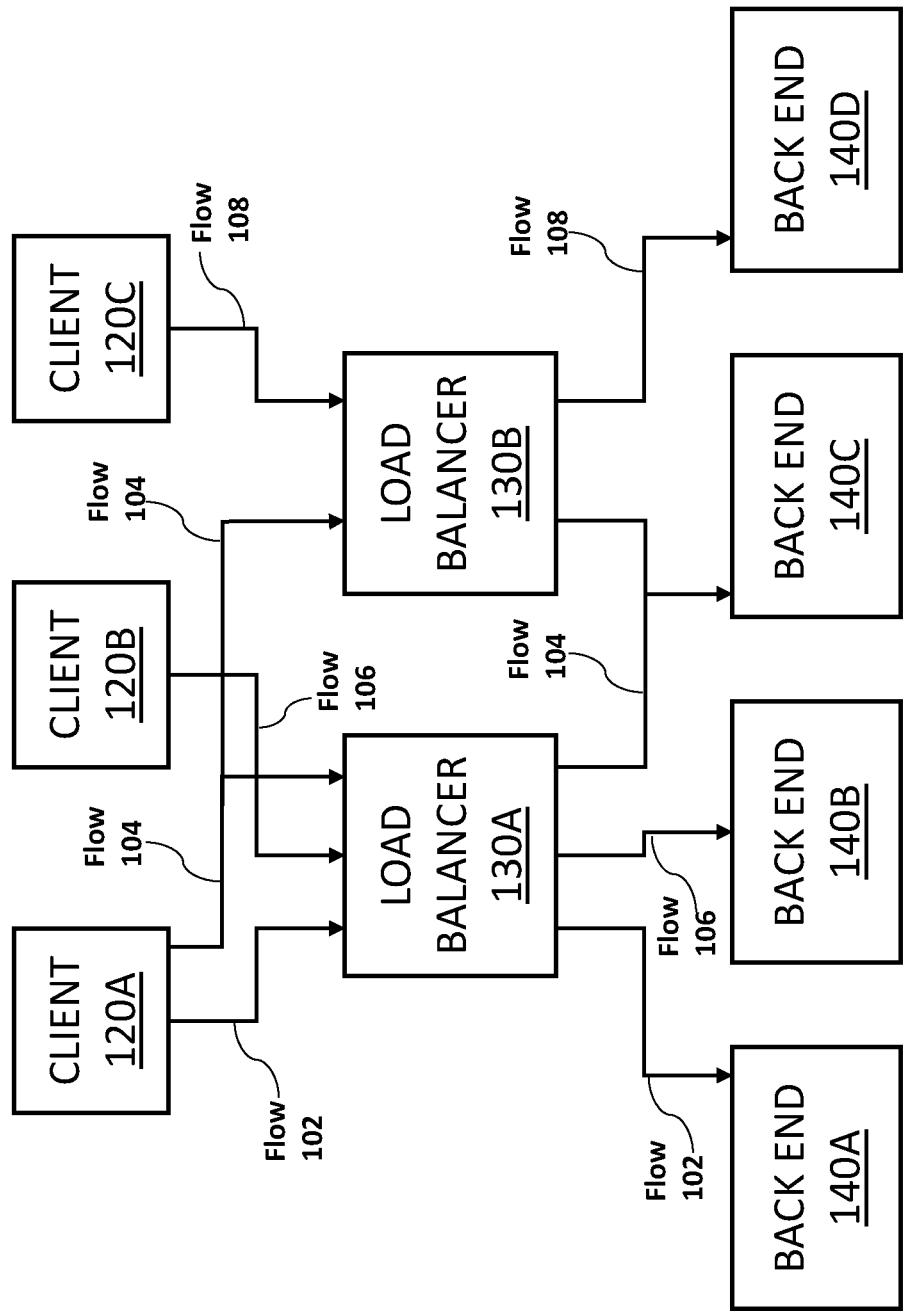
FIG. 1B is a functional block diagram illustrating data flows, in accordance with an embodiment of the present invention.

FIG. 1B is a functional block diagram illustrating example data flows transmitted by clients 120A-C, forwarded by load balancers 130A-B, to back ends 140A-C, in accordance with various embodiments of the present invention. The data flow forwarding described herein can be implemented by the distributed affinity tracking system 100 of FIG. 1A. Each one of clients 120A-C represents client 120, as previously described with regard to FIG. 1A. Each one of load balancers 130A-B represents load balancer 130, as previously described with regard to FIG. 1A. Each one of back ends 140A-C represents back end 140, as previously described with regard to FIG. 1A. In an embodiment, load balancer 130A may forward data, sent from client 120A (flow 102), to back end 140A. Furthermore, flow 104, transmitted by client 120A, may be multiplexed and forwarded by both load balancer 130A and load balancer 130B to back end 140C. Additionally, in an embodiment, load balancer 130A may forward data, sent from client 120B (flow 106), to back end 140B. Also, load balancer 130B may forward data, sent from client 120C (flow 108) to back end 140D.

Figure 2A:
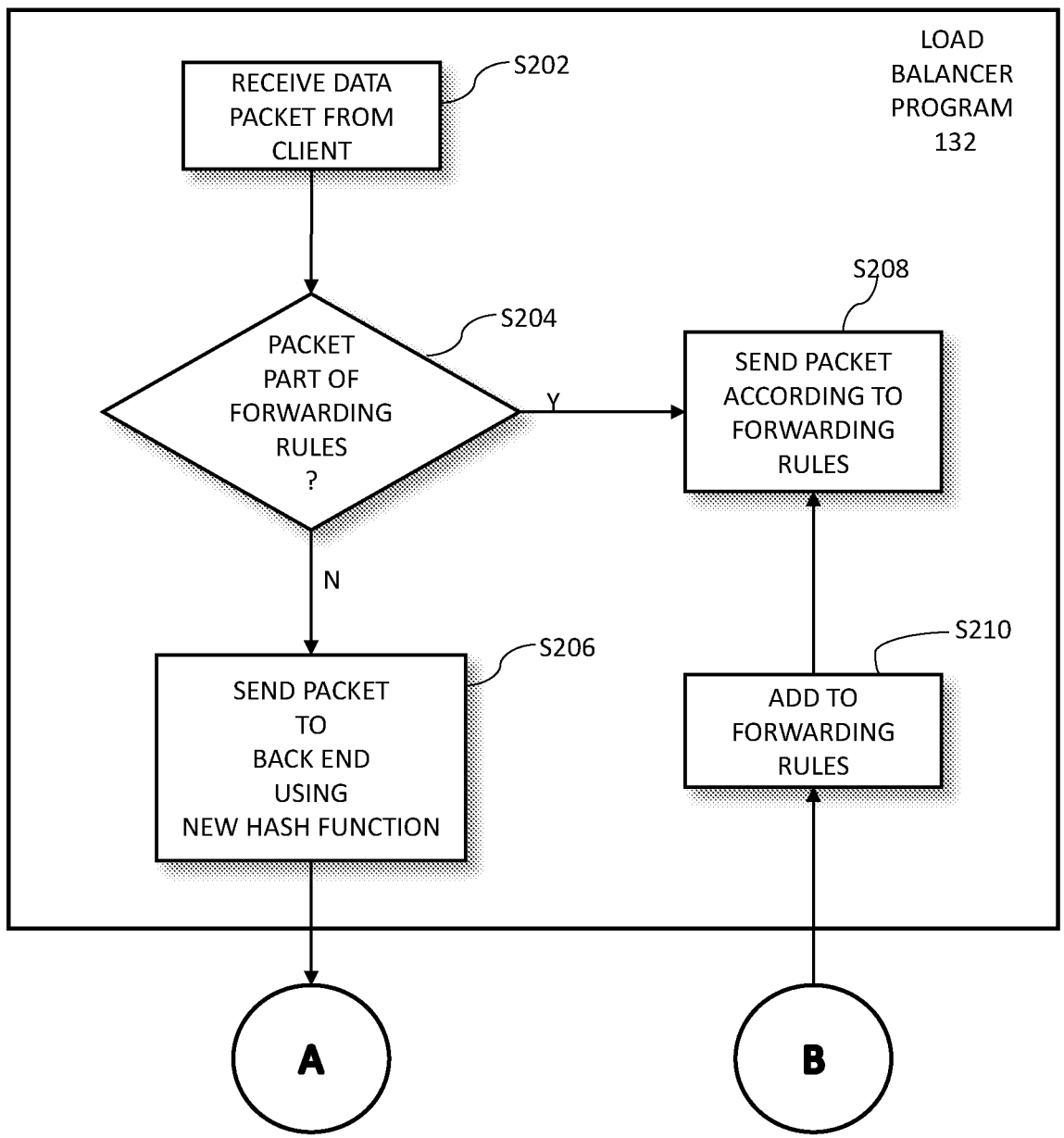
FIG. 2A is a flowchart illustrating the operations of the load balancer of FIG. 1A, in accordance with an embodiment of the invention.

FIG. 2A shows a flowchart illustrating the operations of load balancer program 132 in accordance with an embodiment of the invention. Referring to step S202, load balancer program 132 receives a data packet (e.g. a TCP 5-tupple) from a client computing device (e.g. client 120) via a TCP connection. Load balancer program 132 may utilize connection tracking, described above, to track data flows. Load balancer program 132 may also utilize the consistent-hashing approach, mentioned above, which employs a specially designed hash function to calculate hash values and create a lookup table to deterministically map data flows. Notwithstanding the use of consistent-hashing by load balancer program 132, a change to the back-end network service node pool, for example, an addition or removal of a back-end network service node, may result in some number of existing data flows being erroneously forwarded, via an altered lookup table, to a new back-end network service node. In an example embodiment, load balancer program 132 receives a 5-tupple data packet from client program 122 as part of a data flow, via a TCP connection.

Referring to step S204, load balancer program 132 may first determine if the 5-tupple data packet received in step S202 is accounted for in the existing forwarding rules, stored within load balancer 130 and resulting from connection tracking performed by load balancer program 132. Load balancer program 132 makes this determination by verifying if the source IP address and source port number for the received data packet are within the forwarding rules. If the source IP address and source port number for the received data packet are found in the existing forwarding rules, load balancer program 132 proceeds to step S208. If the source IP address and source port number for the received data packet are not found in the existing forwarding rules, load balancer program 132 proceeds to step S206. In an example embodiment, load balancer program 132 determines that the source IP address and source port number are not within the existing forwarding rules.

Referring to step S206, in response to determining that the source IP address and source port number for the received data packet is not within the existing forwarding rules, load balancer program 132 may transmit the received data packet to the back-end network service node pool using a new hash value. This action may be the result of a change in the back-end network service node pool (e.g. addition or removal of a back-end network service node). The consequence of the received data packet being forwarded using a new hash value is that the received data packet may be forwarded to a different back-end network service node, rather than the node already serving data packets related to the received data packet. For example, in the embodiment depicted in FIG. 1B, back end 140A may already be servicing the data flow associated with the received data packet, however, when 140C goes offline, the received data packet may be routed to back end 140B rather than back end 140A. The data flow related to the data packet received in step S202 may be disrupted as a result of forwarding the received data packet to a different back-end network service node. In an example embodiment, load balancer program 132 forwards the data packet, received from client program 122, to back end program 142 using a new hash value.

Referring to step S208, in response to determining that the source IP address and source port number for the received data packet is within the existing forwarding rules, or in response to notification from back end program 142 containing forwarding decision information, load balancer program 132 may forward the received data packet according to the existing forwarding rules and consequently maintain affinity.

Figure 2B:
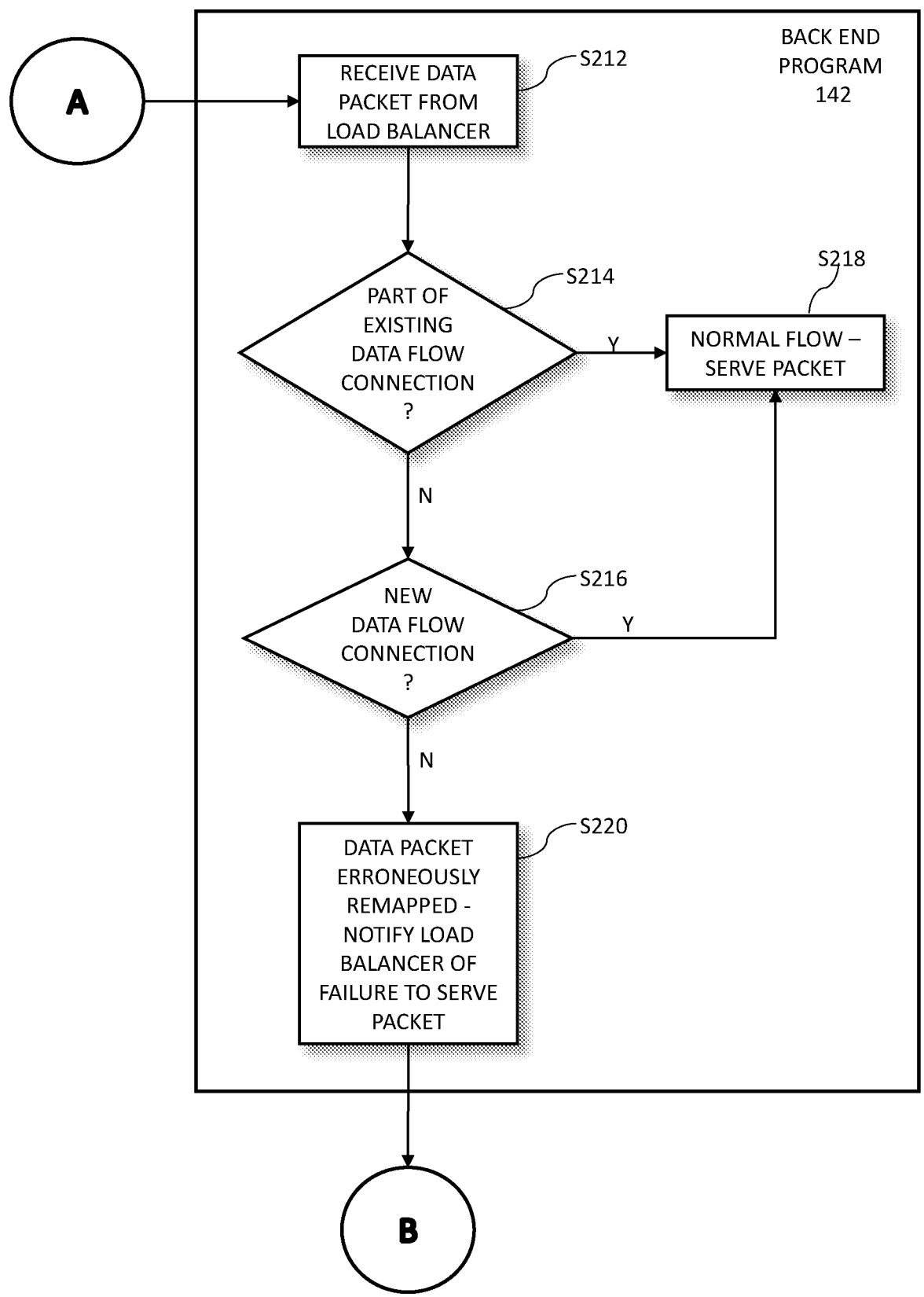
FIG. 2B is a flowchart illustrating the operations of the back end of FIG. 1A, in accordance with an embodiment of the invention.

FIG. 2B shows a flowchart illustrating the operations of back end program 142 in accordance with an embodiment of the invention. Referring to step S212, back end program 142 receives a data packet from a load balancer node (e.g. load balancer 130) utilizing consistent-hashing to calculate hash values and map data flows via a lookup table. The received data packet may be one of several related data packets which form a data flow from a client computing device (e.g. client 120). In an example embodiment, back end program 142 receives a data packet sent from load balancer program 132 via a new hash value and altered lookup table. The new hash value and table may be calculated following a change to the back-end network service node pool. Although load balancer program 132 uses consistent-hashing to reduce erroneous remapping of data packets in response to changes in the back-end network service node pool, a change in the pool may result in some data packets being erroneously forwarded via an altered lookup table.

Referring to step S214, back end program 142 may determine if the received data packet is part of an existing data flow connection that is already being served by back end 140. This determination is made possible through the connection tracking already performed by back end program 142 and its ability to map currently served data flows. In an example embodiment, back end program 142 may track, for each incoming data flow, tracking characteristics such as, source IP address, source port number, destination IP address, destination port number, and the protocol in use (e.g. a TCP 5-tupple). Back end program 142 may receive a data packet, as part of a data flow, from load balancer program 132. Back end program 142 may compare the source IP address and source port number, for the received data packet, against a list of its own existing connections to determine if the received data packet is part of a data flow already served by back end 140. If the received data packet is part of an existing data flow connection, specifically, if the source IP address and source port number for the received data packet match-up with an already connected source IP address and source port number, back end program 142 proceeds to step S218. If the received data packet is not part of an existing data flow, that is, if the source IP address and source port number for the received data packet does not match-up with an already connected source IP address and source port number, back end program 142 proceeds to step S216.

Referring to step S216, back end program 142 determines if the received data packet represents the beginning of a new connection by deciding if the synchronize (SYN) flag for the received data packet is enabled. In an example embodiment, back end program 142 may determine if the SYN flag for the received data packet is enabled. In the context of a TCP connection, a network client may attempt to start a new TCP connection to a network server by sending a SYN message to the network server. In addition to accepting its own existing connections (as in step S218 below), back end program 142 may also accept and process new connections. If the received data packet represents the beginning of a new connection (i.e. a new data flow), specifically, if the SYN flag for the received data packet is enabled, back end program 142 proceeds to step S218. If the received data packet does not represent the beginning of a new connection (i.e. a new data flow), specifically, if the SYN flag for the received data packet is not enabled, back end program 142 proceeds to step S220.

Referring to step S218, back end program 142 may process the data packet received in step S212, either in response to determining that the received data packet is part of an existing, currently served data flow (step S214), or in response to determining that the received data packet is the beginning of a new connection (step S216). In either event, back end program 142 accepts the data flow.

Referring to step S220, back end program 142 may detect the erroneous remapping of the received data packet and may notify the sending load balancer node (e.g. load balancer 130) of the erroneous remapping and the failure to process the received data packet. Furthermore, back end program 142 may also provide the sending load balancer node (e.g. load balancer 130) with information such as, tracking characteristics for the data packet (e.g. source IP address, source port number, destination IP address, destination port number, and the protocol in use), forwarding decision suggestions, and notifications of changes in the back-end network service node pool. By sending such information, back end program 142 enables the load balancer node (e.g. load balancer 130) to update its forwarding decision rules and prevent any further erroneous remapping, without having to engage in additional connection tracking and without requiring synchronization of the connection tracking state among the load balancer nodes. In an example embodiment, back end program 142 detects the erroneous remapping of the data packet received in step S212 from load balancer program 132 by determining that the received data packet is not part of an existing data flow connection (step S214) and is not the beginning of a new data flow connection (step S216). Back end program 142 notifies load balancer program 132 of the erroneous remapping and of the failure to process the received packet. Furthermore, back end program 142 provides load balancer program 132 with tracking characteristics and forwarding decision suggestions for the received data packet.

Referring to step S210, in response to notification from back end program 142, load balancer program 132 may update its existing forwarding rules to map the received data packet to the back-end network service node used prior to any changes in the node pool. The information received from back end program 142 may notify load balancer program 132 of the erroneous remapping of the received data packet to back end 140, the failure to serve the received data packet, and include details such as tracking characteristics for the received data packet (e.g. source IP address, source port number, destination IP address, destination port number, and the protocol in use), forwarding decision, and notifications of changes in the back-end network service node pool. In an example embodiment, load balancer program 132 receives notification from back end program 142 of the failure to process the received data packet due to the erroneous remapping, by load balancer program 132, of the received data packet to back end 140.

Figure 3A:
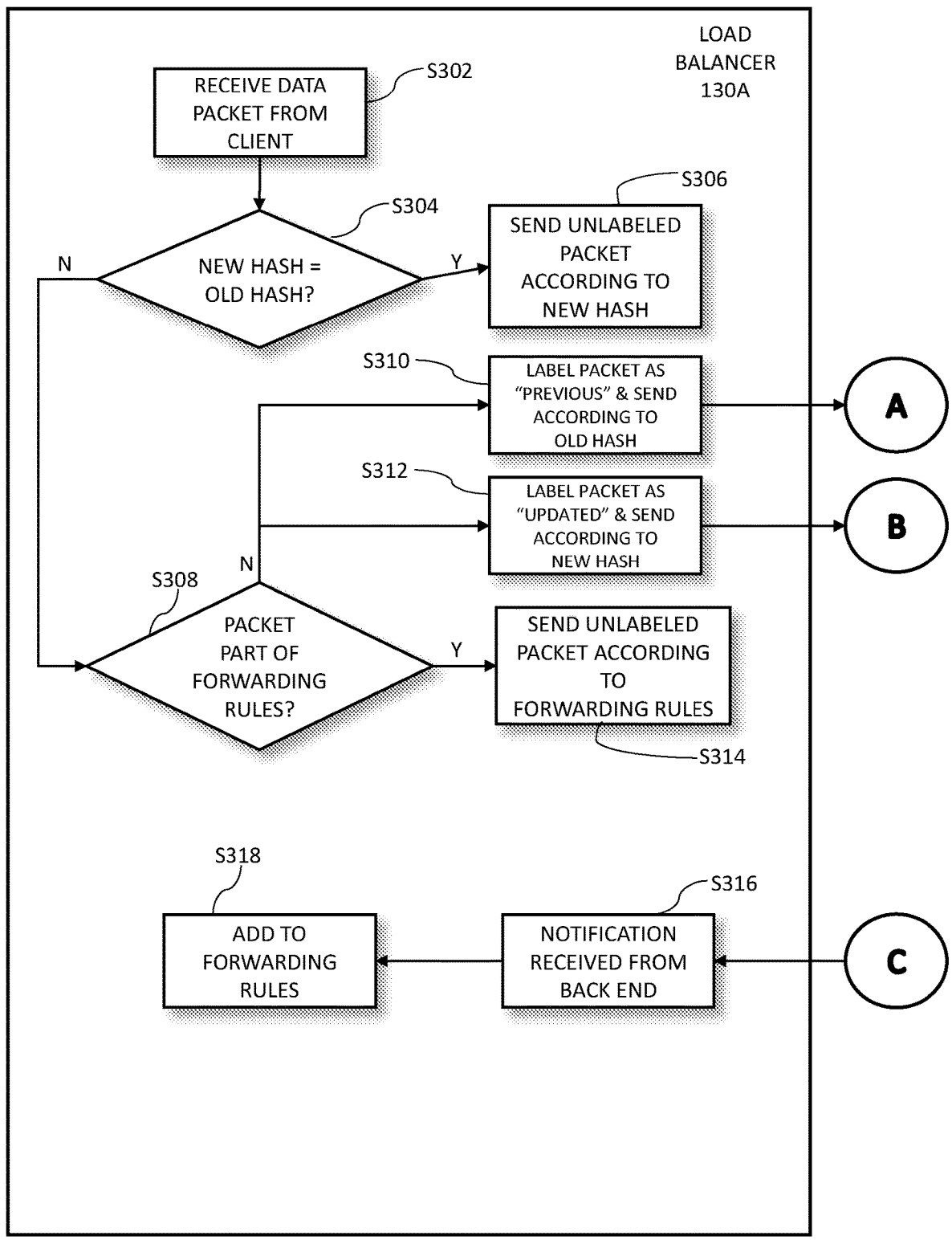
FIG. 3A is a flowchart illustrating the operations of the load balancer of FIG. 1B, in accordance with another embodiment of the invention.

FIG. 3A shows a flowchart illustrating the operations of load balancer 130A in accordance with another embodiment of the invention. Referring to step S302, load balancer 130A receives a data packet (e.g. a TCP 5-tupple) from a client computing device (e.g. client 120) via a TCP connection. The received data packet may be one of several related data packets which form a data flow from the client computing device. Load balancer 130A may utilize connection tracking, described above, to track data flows. Load balancer 130A may also utilize the consistent-hashing approach, described above, which employs a specially designed hash function to calculate hash values and create a lookup table to deterministically map a data flows. Despite the use of consistent-hashing by load balancer 130A, a change to the back-end network service node pool or a change in the pool of available load balancer nodes may result in some number of existing data flows being erroneously forwarded, via an altered lookup table, to an updated back-end network service node. For example, the lookup table may be altered in response to the addition or removal of a back-end network service node or a load balancer node. In an example embodiment, load balancer 130A receives a 5-tupple data packet from client 120A as part of a data flow, via a TCP connection.

Referring to step S304, load balancer 130A may first determine if the received 5-tupple data packet, as part of a data flow from the client computing device (e.g. client 120A), has been remapped. Data flow remapping may occur in response to a change in either the pool of load balancer nodes or the pool of back-end network service nodes. The value of the consistent-hash used for the data flow may be used to determine a mapping for the data flow. Remapped flows are flows for which the value of the consistent-hash has changed. Load balancer 130A may detect remapped flows by comparing values of the consistent-hash used for the data flow before ("previous hash") and after ("updated hash") some change in the network environment (e.g. addition or removal of a back-end network service node or a load balancer node). If the updated hash is equal to the previous hash, the data flow has not been remapped, and load balancer 130A proceeds to step S306. However, if the updated hash is not equal to the previous hash, load balancer 130A proceeds to step S308.

Referring to step S306, in response to determining that the updated hash and the previous hash values for the received data packet are the same, load balancer 130A may transmit the received data packet to the back-end network service node pool using the updated hash. Since there was no change in the hash value used in the lookup table, the data flow from the client computing device is not disrupted.

Referring to step S308, in response to determining that the updated hash and the previous hash values for the received 5-tupple data packet are not the same, load balancer 130A may then determine if the 5-tupple data packet received in step S302 is accounted for in the existing forwarding rules, stored within load balancer 130A and resulting from connection tracking performed by load balancer 130A. Load balancer 130A makes this determination by verifying if the source IP address and source port number for the received data packet are within the forwarding rules. If the source IP address and source port number for the received data packet are found in the existing forwarding rules, load balancer 130A proceeds to step S314. If the source IP address and source port number for the received data packet are not found in the existing forwarding rules, load balancer 130A proceeds to steps S310 and S312. In an example embodiment, load balancer 130A determines that the source IP address and source port number are not within the existing forwarding rules.

In response to determining that the source IP address and source port number for the received data packet is not within the existing forwarding rules, load balancer 130A may, in step S310, label the received data packet as "previous" and use the previous hash to forward the received data packet, or a duplicate identical packet, to the back-end network service node in use prior to some change in the network environment ("previous backend"). Concurrently, and in response to determining that the source IP address and source port number for the received data packet is not within the existing forwarding rules, load balancer 130A may, in step S312, label the received data packet as "updated" and use the updated hash to forward the received data packet, or a duplicate identical packet, to the back-end network service node in use after some change in the network environment ("updated backend"). The previous backend and the updated backend may then decide if it will serve the received data packet. Furthermore, the previous backend and the updated backend may provide feedback to load balancer 130A indicating whether the received data packet was served or dropped. Both previous backend and updated backend serve existing, ongoing data flow connections and unlabeled data packets. However, only updated backend accepts new data flow connections.

Referring to step S314, in response to determining that the source IP address and source port number for the received data packet is within the existing forwarding rules, load balancer 130A may forward the received data packet according to the existing forwarding rules, thereby maintaining data affinity.

Figure 3B:
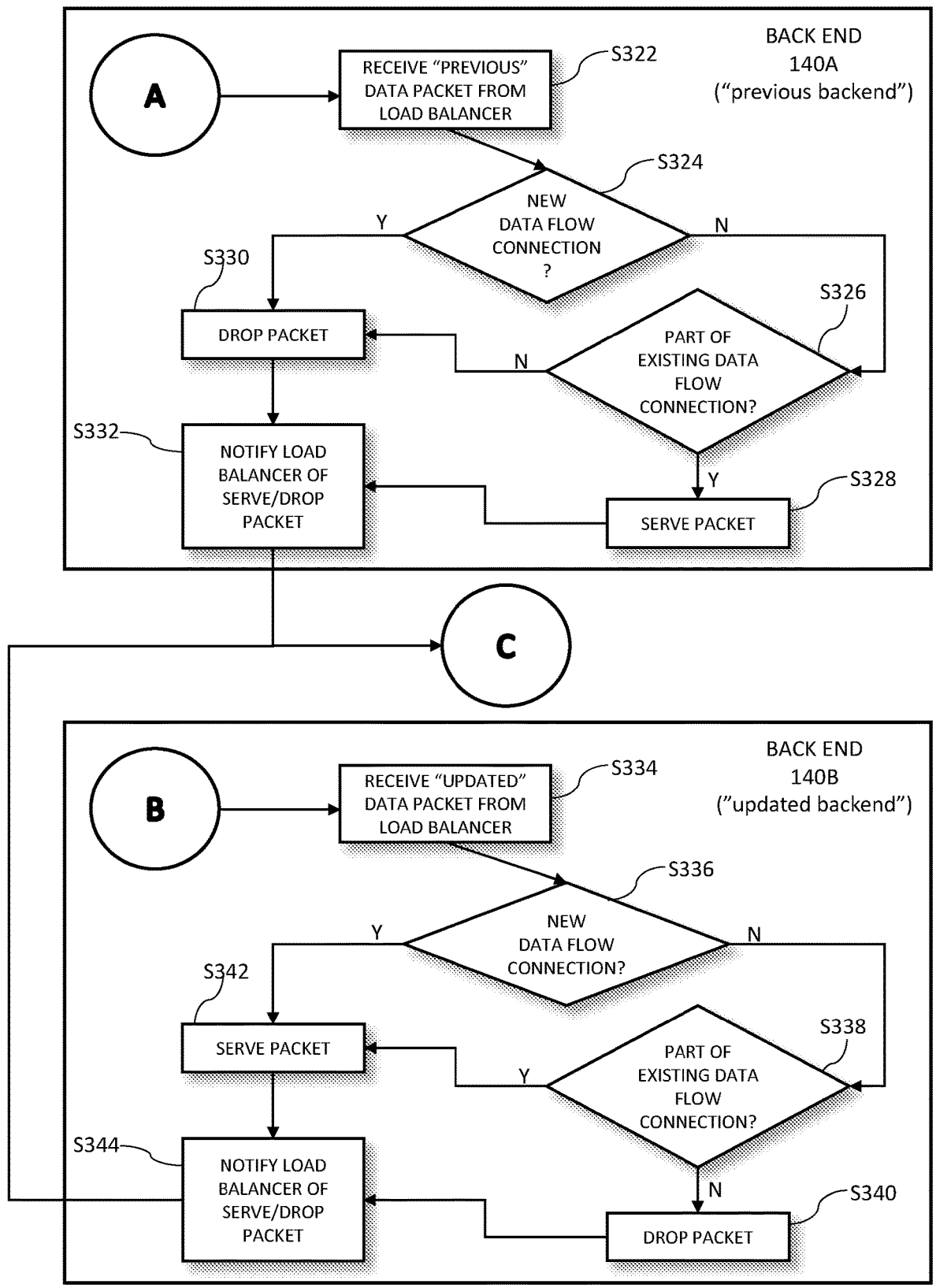
FIG. 3B is a flowchart illustrating the operations of the back ends of FIG. 1B, in accordance with another embodiment of the invention.

FIG. 3B shows a flowchart illustrating the operations of back end 140A and back end 140B in accordance with another embodiment of the invention. Referring to step S322 back end 140A ("pervious backend") receives a labeled data packet from a load balancer node (e.g. load balancer 130A) utilizing a consistent-hashing value (i.e. previous hash or updated hash). The received data packet may be one of several related data packets which form a data flow from a client computing device (e.g. client 120A). In an example embodiment, following a change to the back-end network service node pool or the load balancer node pool, previous backend receives, from load balancer 130A utilizing a new hash value lookup key, a data packet which has been labeled "previous".

Referring to step S324, previous backend determines if the received "previous" data packet represents the beginning of a new connection by deciding if the synchronize (SYN) flag for the received "previous" data packet is enabled. In embodiments of the invention, previous backend and updated backend serve existing, ongoing data flow connections and unlabeled data packets. However, previous backend does not accept "previous" data packets of new data flow connections. In embodiments of the invention, previous backend may determine if the SYN flag for the received "previous" data packet is enabled. If the received "previous" data packet represents the beginning of a new connection (i.e. a new data flow), specifically, if the SYN flag for the received "previous" data packet is enabled, previous back-end proceeds to step S330. If the received "previous" data packet does not represent the beginning of a new connection (i.e. a new data flow), specifically, if the SYN flag for the received "previous" data packet is not enabled, previous backend proceeds to step S326.

Referring to step 326, previous backend may determine if the received "previous" data packet is part of an existing data flow connection that is already being served by previous backend. This determination is made possible through the connection tracking already performed by previous backend and its ability to map currently served data flows. In an example embodiment, previous backend may track, for each incoming "previous" data packet, the source IP address, source port number, destination IP address, destination port number, and the protocol in use (e.g. a TCP 5-tupple). Previous backend may receive a "previous" data packet from load balancer 130A. The received data packet is part of a data flow from client 120A. Previous backend may compare the source IP address and source port number, for the received "previous" data packet, against a list of its own existing connections to determine if the received "previous" data packet is part of a data flow already served by previous backend. If the received "previous" data packet is part of an existing data flow connection, previous backend proceeds to step S330. If the received "previous" data packet is not part of an existing data flow, previous backend proceeds to step S326.

Referring to step S328, previous backend may serve the "previous" data packet received in step S322 in response to determining that the received "previous" data packet is part of an existing, currently served data flow (step S326) and is not the beginning of a new connection (step S324). As a result of both determinations, previous backend accepts and processes the data flow.

Referring to step S330, previous backend may drop the "previous" data packet received in step S322, either in response to determining that the received "previous" data packet is not part of an existing, currently served data flow (step S326), or in response to determining that the received "previous" data packet is the beginning of a new connection (step S324). In either event, previous backend drops the data flow.

Referring to step S332, previous backend may notify the sending load balancer node (e.g. load balancer 130A) of the action taken concerning the "previous" data packet received in step S322, namely, servicing of the data packet or dropping of the data packet.

Referring to step S316, load balancer 130A may receive notification from both previous backend and updated back-end, depicted in FIG. 3B, indicating the respective action (e.g. packet served or packet dropped) taken by each back-end in response to the received, or duplicated, labeled data packet forwarded in steps S310 and S312.

Referring to step S318, load balancer 130A receives notification from both previous backend and updated back-end. Load balancer 130A is expected to get a "drop" notification from one back-end and a "serve" notification from the other. In both cases load balancer 130A adds a forwarding rule to send future data packets of the same data flow only to the correct back-end (i.e. serving back-end). Furthermore, future data packets of the same data flow would be sent unlabeled and in accordance with the newly added forwarding rule. In an example embodiment where load balancer 130A receives a "drop" notification from pervious backend, load balancer 130A may then add a rule to forward future unlabeled data packets of the same data flow to the serving back-end.

In an optional embodiment, step S316 and step S318 of FIG. 3A may not be implemented, as load balancer 130A will not receive notification from either previous backend or updated backend. Upon detection of a remapped data flow ("N" branch of step S304), load balancer 130A may directly proceed to duplicate the received data packet and send the resulting labeled data packets to both previous and updated backend (steps S310 and S312). In this optional embodiment, steps S308 and S314 are also not implemented as load balancer 130A will not receive notifications from either previous backend or updated backend which concern the sent labeled data packets and which may result in additions to the forwarding rules. Previous backend and updated backend decide if the data flow should be served and either serves or drops the data packet, without providing feedback to load balancer 130A. Back-end network service nodes track their respective data flow connections, via connection tracking already performed by back-end network service nodes, and drop unserved data packets.

Referring to step S334, back end 140B ("updated back-end") receives a labeled data packet from a load balancer node (e.g. load balancer 130A) utilizing a consistent-hashing value (i.e. previous hash or updated hash). The received data packet may be one of several related data packets which form a data flow from a client computing device (e.g. client 120A). In an example embodiment, following a change to the back-end network service node pool or the load balancer node pool, updated backend receives, from load balancer 130A utilizing a new hash value lookup key, a data packet which has been labeled "updated".

Referring to step S336, updated backend determines if the received "updated" data packet represents the beginning of a new connection by deciding if the synchronize (SYN) flag for the received "updated" data packet is enabled. In addition to accepting its own existing connections (as in step S342 below), updated backend may also accept and serve new connections. In embodiments of the invention, previous backend and updated backend serve existing, ongoing data flow connections and unlabeled data packets. However, only updated backend accepts "updated" data packets of new data flow connections. In embodiments of the invention, updated backend may determine if the SYN flag for the received "updated" data packet is enabled. If the received "updated" data packet represents the beginning of a new connection (i.e. a new data flow), specifically, if the SYN flag for the received "updated" data packet is enabled, updated backend proceeds to step S342. If the received "updated" data packet does not represent the beginning of a new connection (i.e. a new data flow), specifically, if the SYN flag for the received "updated" data packet is not enabled, updated backend proceeds to step S338.

Referring to step S338, updated backend may determine if the received "updated" data packet is part of an existing data flow connection that is already being served by updated backend. This determination is made possible through the data connection tracking already performed by updated backend and its ability to map currently served data flows. In an example embodiment, updated backend may track, for each incoming 5-tupple data packet, the source IP address, source port number, destination IP address, destination port number, and the protocol in use (e.g. a TCP 5-tupple). Updated backend may receive an "updated" data packet from load balancer 130A. The received "updated" data packet is part of a data flow from client 120A. Updated backend may compare the source IP address and source port number, for the received "updated" data packet, against a list of its own existing connections to determine if the received data packet is part of a data flow already served by updated backend. If the received "updated" data packet is part of an existing data flow connection, updated backend proceeds to step S342. If the received "updated" data packet is not part of an existing data flow, updated backend proceeds to step S340.

Referring to step S340, updated backend may drop the "updated" data packet received in step S322, in response to determining that the received "updated" data packet is not part of an existing, currently served data flow (step S338), and in response to determining that the received data packet is also not the beginning of a new connection (step S336). As a result of both determinations, updated backend drops the data flow.

Referring to step S342, updated backend may serve the "updated" data packet received in step S334, either in response to determining that the received "updated" data packet is part of an existing, currently served data flow (step S338), or in response to determining that the received "updated" data packet is the beginning of a new connection (step S336). In either event, updated backend accepts and processes the data flow.

Referring to step S344, updated backend may notify the sending load balancer node (e.g. load balancer 130A) of the action taken concerning the "updated" data packet received in step S334, namely, servicing of the "updated" data packet or dropping of the "updated" data packet.

Figure 7:
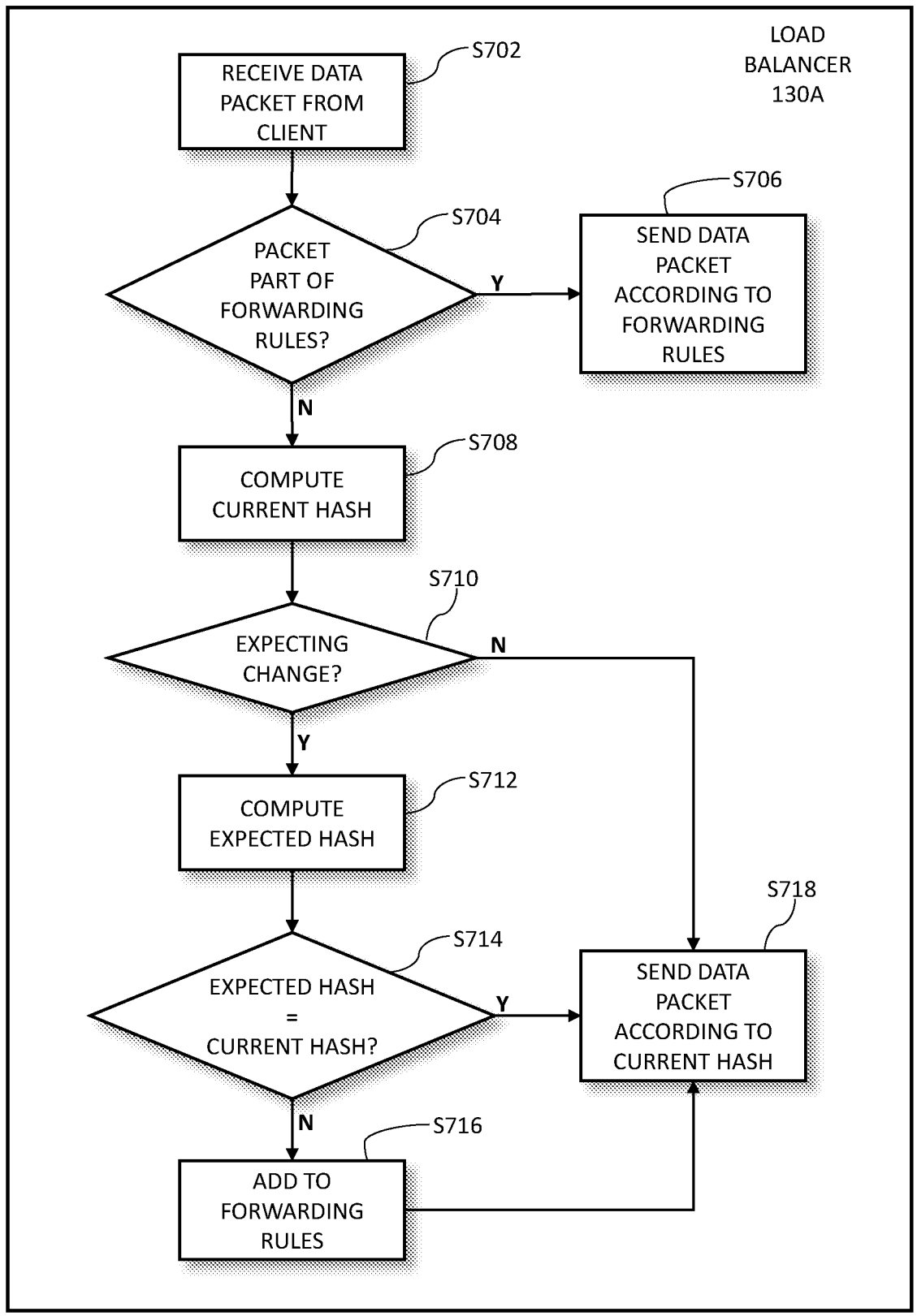
FIG. 7 depicts a flowchart illustrating the operations of the load balancer of FIG. 1B, in accordance with an alternative embodiment of the invention.

FIG. 7 shows a flowchart illustrating the operations of load balancer 130A in accordance with an alternative embodiment of the invention where connection tracking is performed only for data packets having an expected change in their corresponding consistent-hash values. Referring to step S702, load balancer 130A receives a data packet (e.g. a TCP 5-tuple) from a client computing device (e.g. client 120) via a TCP connection. The received data packet may be one of several related data packets which form a data flow from the client computing device. Load balancer 130A may utilize connection tracking, described above, to track data flows. Load balancer 130A may also utilize the consistent-hashing approach, described above, which employs a specially designed hash function to calculate hash values and create a lookup table to deterministically map a data flow. In an alternative embodiment, load balancer 130A receives a 5-tupple data packet from client 120A as part of a data flow, via a TCP connection.

Referring to step S704, load balancer 130A may determine if the 5-tupple data packet received in step S702 is accounted for in the existing forwarding rules, stored within load balancer 130A and resulting from connection tracking performed by load balancer 130A. Load balancer 130A may verify if the source IP address and source port number for the received data packet are within the forwarding rules. If the source IP address and source port number for the received data packet are found in the existing forwarding rules, load balancer 130A proceeds to step S706. If the source IP address and source port number for the received data packet are not found in the existing forwarding rules, load balancer 130A proceeds to steps S708. In an alternative embodiment, load balancer 130A determines that the source IP address and source port number are not within the existing forwarding rules.

In general, embodiments of the present invention apply to any forwarding decision performed on TCP packets, IP packets, or any other traffic. A 5-tupple includes source and destination IPs, source and destination ports, and the protocol in use. The destination IP and destination port typically represent the service being used, therefore all packets using the same service will have identical values. If a load balancer is supporting multiple services, then connection tracking must use the destination IP and destination port. However, if the load balancer supports only one service, then the destination IP and port values are the same for all packets and tracking/forwarding may be performed using only the source IP and source port values. In most systems the pool of back-end network service nodes is service specific, consequently, hashing is performed separately for each service and may only use the source IP and source port values. Whereas connection tracking typically utilizes the entire 5-tupple since the tracking may be shared among multiple services.

Referring to step S706, in response to determining that the source IP address and source port number for the received data packet is within the existing forwarding rules, load balancer 130A may forward the received data packet according to the existing forwarding rules, thereby maintaining data affinity.

Referring to step S708, in response to determining that the source IP address and source port number for the received data packet is not within the existing forwarding rules, load balancer 130A may compute a first mapping value based on the value of the current consistent-hash for the 5-tupple data packet, received in step S702 as part of a data flow from the client computing device (e.g. client 120A). The value of the consistent-hash used for the data flow may be used to determine a mapping for the data flow.

Referring to step S710, load balancer 130A may determine if a change to the back-end network service node pool is expected. The expectation of a change may be based on a global DAT system 100 state which may toggle between two states, namely, expecting-change and not-expecting-change. Toggling between an expecting-change state and a not-expecting-change state may result from an action of an administrator of DAT system 100 or from an automated monitoring of DAT system 100. For example, the administrator may toggle the global DAT system 100 state to expecting-change in response to an expected change to the configuration of the back-end network service node pool. The configuration change may include the planned addition of one or more back-end network service nodes (i.e., a scale-up event) or the removal of one or more back-end network service nodes due to planned maintenance or failure (i.e., a scale-down event). As another example, automated monitoring of DAT system 100 may set the global DAT system 100 state. The monitoring may track DAT system 100 load trends and provide load forecasts which may indicate an expected scale-up or scale-down event which in turn may result in toggling the global DAT system 100 state to expecting-change. Furthermore, the monitoring may detect failure of a back-end network service node and treat such failure as a scale-down event. If a change is expected, load balancer 130A may proceed to step S712. However, if a change is not expected, load balancer 130A may proceed to step S718. In an alternative embodiment, load balancer 130A may reference the global DAT system 100 state and determine that DAT system 100 is in a state of expecting-change. In yet another alternative embodiment, DAT system 100 may be in permanent state of expecting-change.

Referring to step 712, in response to determining that a change to the configuration of the back-end network service node pool is expected, load balancer 130A may compute a second mapping value based on the value of the expected consistent-hash for the 5-tupple data packet, received in step S702 as part of a data flow from the client computing device (e.g. client 120A). Despite the use of consistent-hashing by load balancer 130A, a change to the configuration of the back-end network service node pool may result in some number of existing data flows being erroneously forwarded. The expected consistent-hash value represents the predicted hash value after the expected change. Inputs to the consistent-hashing function utilized may include attributes of the received data packet, the state of the network before the expected change, and the state of the network after the expected change.

Referring to step S714, load balancer 130A may determine if the received 5-tupple data packet, as part of a data flow from the client computing device (e.g. client 120A), will be remapped. Data flow remapping may occur in response to an expected change in the pool of back-end network service nodes. The value of the consistent-hash used for the data flow may be used to determine a mapping for the data flow. Potentially remapped flows are flows for which the value of the consistent-hash will change in response to an expected change in the pool of back-end network service nodes. Load balancer 130A may predict remapped flows by comparing values of the consistent-hash currently used for the data flow ("current hash") and the expected consistent-hash for the data flow ("expected hash") to be used after the expected change in the pool of back-end network service nodes. If the expected hash is equal to the current hash, the data flow will not be remapped should the expected change occur and load balancer 130A may proceed to step S718. However, if the expected hash is not equal to the current hash, load balancer 130A may proceed to step S716. In an alternative embodiment, load balancer 130A determines that the expected hash and the current hash for the received 5-tupple data packet are not the same. Consequently, load balancer 130A may predict that the received 5-tupple data packet (as part of a data flow from the client computing device, e.g. client 120A), will be remapped in response to an expected change in the pool of back-end network service nodes and proceeds to step S716.

Referring to step S716, in response to determining that the expected hash and the current hash for the received 5-tupple data packet are not the same, load balancer 130A may add details such as tracking characteristics for the received 5-tupple data packet (e.g. source IP address, source port number, destination IP address, destination port number, protocol in use) and a forwarding decision to the existing forwarding rules to be used upon the occurrence of the expected change. In other words, load balancer 130A may begin to perform connection tracking for the received 5-tupple data packet and related future data packets (provided the SYN flag for the received 5-tupple data packet is enabled) since their connection will move when the expected change occurs. The new mapping will be used when the change occurs. In an alternative embodiment, load balancer 130A adds a forwarding decision for the received 5-tupple data packet and related future data packets to the existing forwarding rules. Connection tracking is performed only for the small group of connections which will experience a re-mapping (i.e., move to another back-end network service node) if the expected change occurs. Consequently, system memory is saved as it will not be tied to a very large connection tracking table. It should be noted that this selective connection tracking can apply regardless of the method in which the mapping is calculated (e.g., hash, consistent-hash, or any other mapping). The key is the ability to readily identify whether the mapping may change in response to a change in the back-end network service node pool. However, the use of consistent-hash reduces the number of re-mappings and thereby reduces the number of connections to be tracked. It should also be noted that connections will move only if they start before the expected change and end after it.

Referring to step S718, load balancer 130A may transmit the received data packet to the back-end network service node pool using the current hash. It is significant to note that in the absence of connection tracking information for a received data packet, the received data packet is forwarded according to its current hash.

Furthermore, in the alternative embodiment illustrated by FIG. 7, the occurrence of an arbitrary failure of a back-end network service node may be treated as a scale-down event. In such an occurrence, a back-end network service node, having a consistent-hash value representing the last hash-based mapping position ("hash bucket") within the back-end network service node pool, assumes the hash-based mapping position ("hash bucket") of the failed back-end network service node for new connections. Connection tracking is performed for all connections that would change hash buckets if the back-end network service node in the last position was removed.

While steps of the disclosed method and embodiments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality. Additionally, although FIG. 3B depicts back end 140A as performing the role of "previous backend" and back end 140B as performing the role of "updated backend", it should be noted that in other embodiments the roles of back end 140A and back end 140B may be switched. Moreover, in other embodiments, back ends 140A-B may also receive unlabeled data packets and perform their functions without a role designation as depicted in FIG. 2B.

Figure 4:
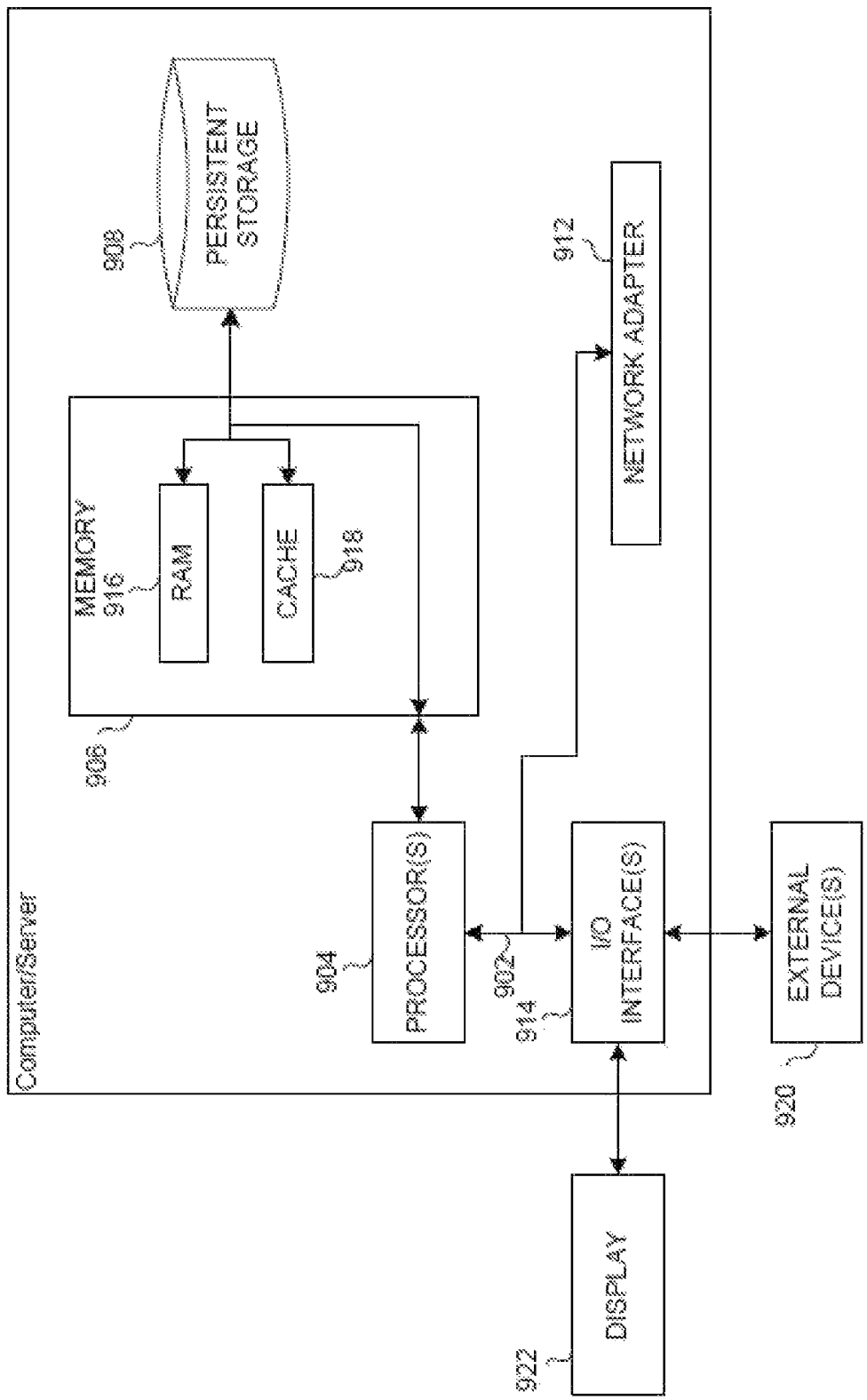
FIG. 4 is a block diagram depicting the hardware components of the distributed affinity tracking system of FIG. 1A, in accordance with an embodiment of the invention.

FIG. 4 depicts a block diagram of components of client 120, load balancer 130, and back end 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Client 120, load balancer 130, and back end 140 include communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs client program 122 in client 120; load balancer program 132 in load balancer 130; and back end program 142 in back end 140 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The programs client program 122 in client 120; load balancer program 132 in load balancer 130; and back end program 142 in back end 140 may be downloaded to persistent storage 908 through network adapter 912.

I/O interface(s) 914 allows for input and output of data with other devices that may be connected to client 120, load balancer 130, and back end 140. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., the programs client program 122 in client 120; load balancer program 132 in load balancer 130; and back end program 142 in back end 140, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
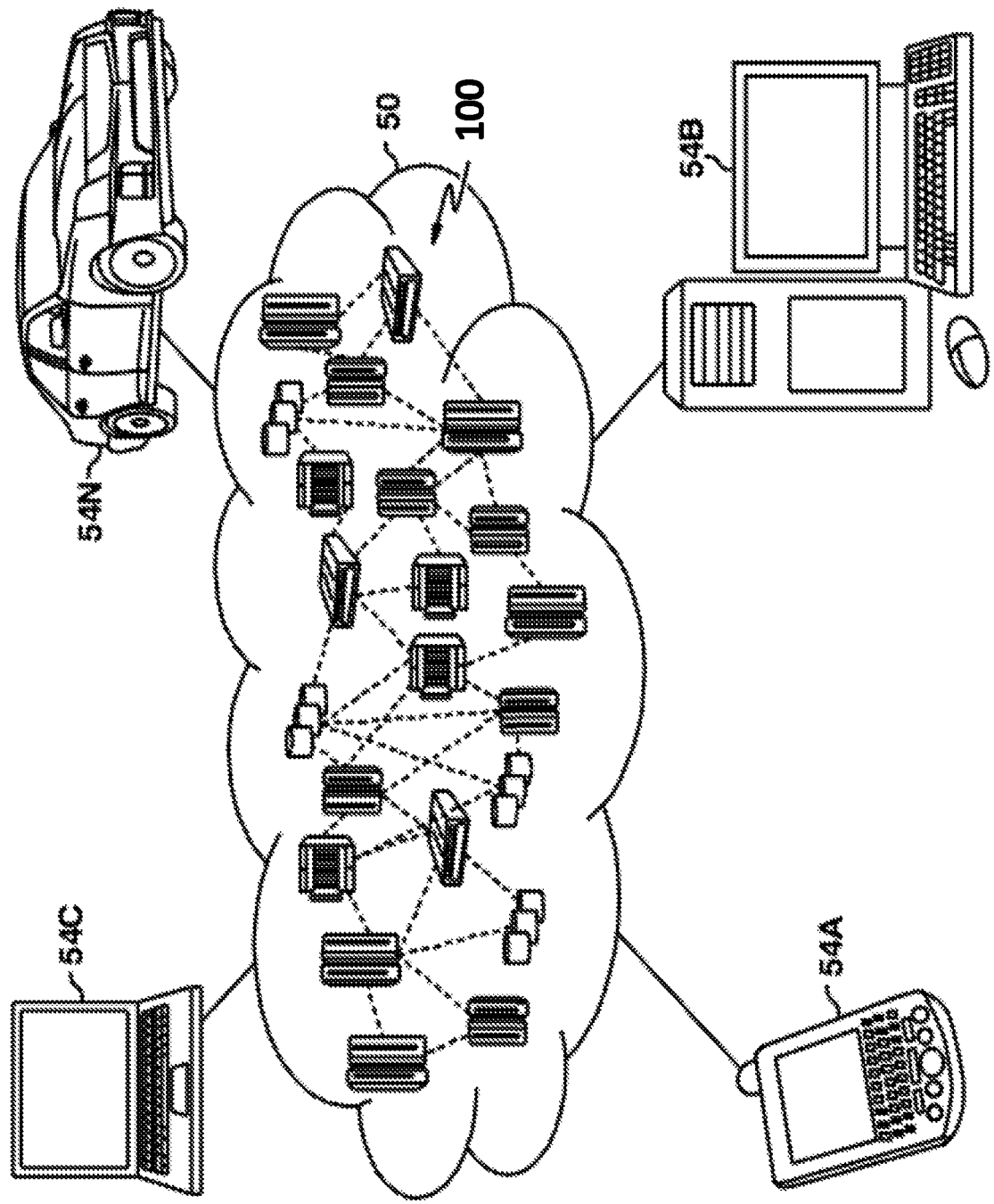
FIG. 5 depicts a cloud computing environment in accordance with an embodiment of the present invention.

Referring now to FIG. 5, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
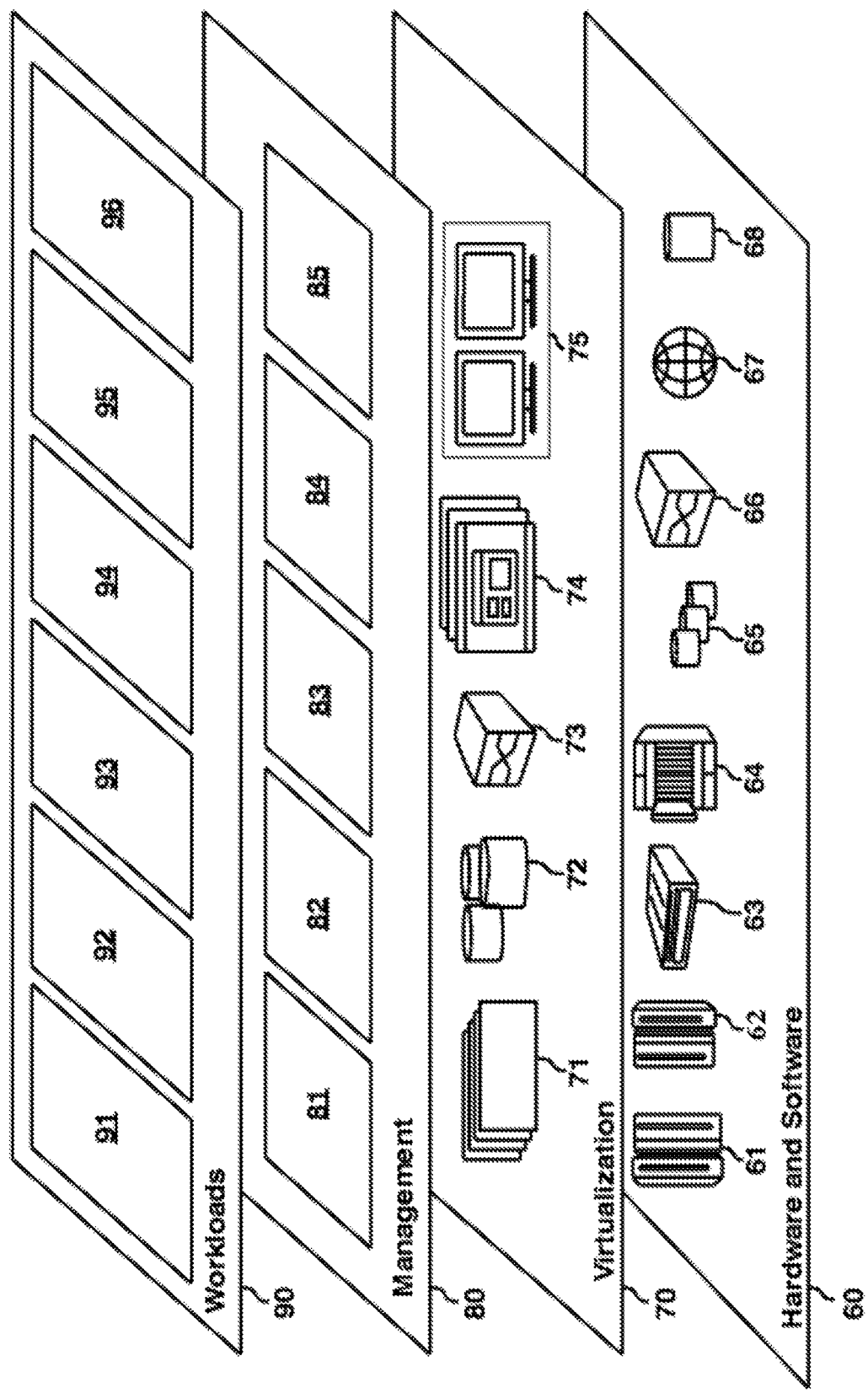
FIG. 6 depicts abstraction model layers in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and distributed affinity tracking system 96. Distributed affinity tracking system 96 may relate to maintaining affinity of data packets sent across a network. The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A method for data transfer management, the method comprising:
   receiving, by a load balancer, a data packet from a client computing device, wherein the received data packet is part of a data flow;
   determining, by the load balancer, that the received data packet is not part of a data flow tracking list, wherein the data flow tracking list comprises one or more existing data flows tracked by the load balancer;
   computing, by the load balancer, a current mapping value for the received data packet;
   determining, by the load balancer, that a global system state of expecting change exists wherein the global system state of expecting change results from an automated monitoring which tracks network load trends and provides network load forecasts indicative of an expected scale-up or scale-down event;
   in response to determining that the global system state of expecting change exists, computing, by the load balancer, an expected mapping value for the received data packet;
   determining, by the load balancer, that the expected mapping value is not equal to the current mapping value;
   adding, by the load balancer, the data flow to the data flow tracking list, wherein adding the data flow to the data flow tracking list comprises adding one or more tracking characteristics of the received data packet to a list of tracking characteristics for the one or more existing data flows tracked by the load balancer; and forwarding, by the load balancer, the received data packet according to the current mapping value for the received data packet.

2. The method of claim 1, further comprising:

forwarding, by the load balancer, the received data packet according to the current mapping value for the received data packet in response to determining that the global system state of expecting change does not exist or in response to determining that the expected mapping value for the received data packet is equal to the current mapping value for the received data packet.

3. The method of claim 1, further comprising:

forwarding, by the load balancer, the received data packet according to the data flow tracking list in response to determining that the received data packet is part of the data flow tracking list, wherein the data flow tracking list comprises the list of tracking characteristics for the one or more existing data flows tracked by the load balancer.

4. The method of claim 1, wherein the global system state is selected from the group consisting of expecting change and not expecting change, and wherein the global system state of expecting change comprises an expected change in a configuration of a plurality of back-end network service nodes, and wherein the expected change in the configuration of the plurality of back-end network service nodes is selected from the group consisting of a scale-up event and a scale-down event.

5. The method of claim 4, wherein occurrence of an arbitrary failure of a first back-end network service node, having a hash-based mapping position within the plurality of back-end network service nodes, is treated as a scale-down event, and wherein a second back-end network service node, having a last hash-based mapping position within the plurality of back-end network service nodes, assumes the hash-based mapping position of the first back-end network service node.

6. The method of claim 4, wherein the current mapping value is based on a consistent-hash function with a first input, and wherein the expected mapping value is based on the consistent-hash function with a second input, and wherein the first input is determined by a network state prior to the expected change in the configuration of the plurality of back-end network service nodes, and wherein the second input is determined by the network state after the expected change in the configuration of the plurality of back-end network service nodes.

7. The method of claim 1, wherein determining, by the load balancer, that the received data packet is not part of the data flow tracking list further comprises:

comparing the one or more tracking characteristics of the received data packet against the list of tracking characteristics for the one or more existing data flows tracked by the load balancer; and determining that none of the one or more tracking characteristics of the received data packet is on the list of tracking characteristics for the one or more existing data flows tracked by the load balancer.

8. A computer program product for data transfer management, the computer program product comprising:

one or more computer-readable storage devices and program instructions stored on at least one of the one or more tangible storage devices, the program instructions comprising:

program instructions to receive a data packet from a client computing device, wherein the received data packet is part of a data flow;

program instructions to determine that the received data packet is not part of a data flow tracking list, wherein the data flow tracking list comprises one or more existing data flows tracked by the load balancer;

program instructions to compute a current mapping value for the received data packet;

program instructions to determine that a global system state of expecting change exists, wherein the global system state of expecting change results from an automated monitoring which tracks network load trends and provides network load forecasts indicative of an expected scale-up or scale-down event;

in response to determining that the global system state of expecting change exists, program instructions to compute an expected mapping value for the received data packet;

program instructions to determine that the expected mapping value is not equal to the current mapping value;

program instructions to add the data flow to the data flow tracking list, wherein adding the data flow to the data flow tracking list comprises adding one or more tracking characteristics of the received data packet to a list of tracking characteristics for the one or more existing data flows tracked by the load balancer; and program instructions to forward the received data packet according to the current mapping value for the received data packet.

9. The computer program product of claim 8, further comprising:

program instruction to forward the received data packet according to the current mapping value for the received data packet in response to determining that the global system state of expecting change does not exist or in response to determining that the expected mapping value for the received data packet is equal to the current mapping value for the received data packet.

10. The computer program product of claim 8, further comprising:

program instructions to forward the received data packet according to the data flow tracking list in response to determining that the received data packet is part of the data flow tracking list, wherein the data flow tracking list comprises the list of tracking characteristics for the one or more existing data flows tracked by the load balancer.

11. The computer program product of claim 8, wherein the global system state is selected from the group consisting of expecting change and not expecting change, and wherein the global system state of expecting change comprises an expected change in a configuration of a plurality of back-end network service nodes, and wherein the expected change in the configuration of the plurality of back-end network service nodes is selected from the group consisting of a scale-up event and a scale-down event.

12. The computer program product of claim 11, wherein occurrence of an arbitrary failure of a first back-end network service node, having a hash-based mapping position within the plurality of back-end network service nodes, is treated as a scale-down event, and wherein a second back-end network service node, having a last hash-based mapping position within the plurality of back-end network service nodes, assumes the hash-based mapping position of the first back-end network service node.

13. The computer program product of claim 11, wherein the current mapping value is based on a consistent-hash function with a first input, and wherein the expected mapping value is based on the consistent-hash function with a second input, and wherein the first input is determined by a network state prior to the expected change in the configuration of the plurality of back-end network service nodes, and wherein the second input is determined by the network state after the expected change in the configuration of the plurality of back-end network service nodes.

14. The computer program product of claim 8, wherein program instructions to determine that the received data packet is not part of the data flow tracking list further comprises:
- program instructions to compare the one or more tracking characteristics of the received data packet against the list of tracking characteristics for the one or more existing data flows tracked by the load balancer; and
- program instructions to determine that none of the one or more tracking characteristics of the received data packet is on the list of tracking characteristics for the one or more existing data flows tracked by the load balancer.

15. A computer system for data transfer management, the computer system comprising:
- one or more processors, one or more computer-readable memories, one or more computer-readable tangible storage devices, and program instructions stored on at least one of the one or more storage devices for execution by at least of the one or more processors via at least one of the one or more memories, the program instructions comprising:
  - program instructions to receive a data packet from a client computing device, wherein the received data packet is part of a data flow;
  - program instructions to determine that the received data packet is not part of a data flow tracking list, wherein the data flow tracking list comprises one or more existing data flows tracked by the load balancer;
  - program instructions to compute a current mapping value for the received data packet;
  - program instructions to determine that a global system state of expecting change exists, wherein the global system state of expecting change results from an automated monitoring which tracks network load trends and provides network load forecasts indicative of an expected scale-up or scale-down event;
  - in response to determining that the global system state of expecting change exists, program instructions to compute an expected mapping value for the received data packet;
  - program instructions to determine that the expected mapping value is not equal to the current mapping value;
  - program instructions to add the data flow to the data flow tracking list, wherein adding the data flow to the data flow tracking list comprises adding one or more tracking characteristics of the received data packet to a list of tracking characteristics for the one or more existing data flows tracked by the load balancer; and
  - program instructions to forward the received data packet according to the current mapping value for the received data packet.

16. The computer system of claim 15, further comprising:
- program instruction to forward the received data packet according to the current mapping value for the received data packet in response to determining that the global system state of expecting change does not exist or in response to determining that the expected mapping value for the received data packet is equal to the current mapping value for the received data packet.

17. The computer system of claim 15, further comprising:
- program instructions to forward the received data packet according to the data flow tracking list in response to determining that the received data packet is part of the data flow tracking list, wherein the data flow tracking list comprises the list of tracking characteristics for the one or more existing data flows tracked by the load balancer.

18. The computer system of claim 15, wherein the global system state is selected from the group consisting of expecting change and not expecting change, and wherein the global system state of expecting change comprises an expected change in a configuration of a plurality of back-end network service nodes, and wherein the expected change in the configuration of the plurality of back-end network service nodes is selected from the group consisting of a scale-up event and a scale-down event.

19. The computer system of claim 18, wherein occurrence of an arbitrary failure of a first back-end network service node, having a hash-based mapping position within the plurality of back-end network service nodes, is treated as a scale-down event, and wherein a second back-end network service node, having a last hash-based mapping position within the plurality of back-end network service nodes, assumes the hash-based mapping position of the first back-end network service node.

20. The computer system of claim 18, wherein the current mapping value is based on a consistent-hash function with a first input, and wherein the expected mapping value is based on the consistent-hash function with a second input, and wherein the first input is determined by a network state prior to the expected change in the configuration of the plurality of back-end network service nodes, and wherein the second input is determined by the network state after the expected change in the configuration of the plurality of back-end network service nodes.

\* \* \* \* \*